(12) United States Patent
Suzuki et al.

(10) Patent No.: US 9,714,064 B2
(45) Date of Patent: Jul. 25, 2017

(54) POSITIONALLY ADJUSTABLE WINDSHIELD MOUNTING ASSEMBLY FOR A SADDLE-RIDING VEHICLE, AND VEHICLE INCLUDING SAME

(71) Applicant: HONDA MOTOR CO., LTD., Minato-ku, Tokyo (JP)

(72) Inventors: Shota Suzuki, Wako (JP); Ippei Kawamura, Wako (JP); Haruka Tsuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/051,124

(22) Filed: Feb. 23, 2016

(65) Prior Publication Data
US 2016/0251048 A1    Sep. 1, 2016

(30) Foreign Application Priority Data

Feb. 27, 2015  (JP) ................................. 2015-038780
Feb. 27, 2015  (JP) ................................. 2015-038781

(51) Int. Cl.
*B62J 99/00* (2009.01)
*B62J 17/04* (2006.01)

(52) U.S. Cl.
CPC .................................. *B62J 17/04* (2013.01)

(58) Field of Classification Search
CPC ...................................................... B62J 17/04
See application file for complete search history.

(56) References Cited

U.S. PATENT DOCUMENTS

| 4,355,838 A * | 10/1982 | Hickman ................. B62J 17/04 15/250.001 |
| 9,199,683 B2 | 12/2015 | Kitagawa |
| 2002/0084126 A1* | 7/2002 | Bedard .................. B62M 27/02 180/190 |

FOREIGN PATENT DOCUMENTS

JP        2014-028591 A        2/2014

* cited by examiner

*Primary Examiner* — Lori L Lyjak
(74) *Attorney, Agent, or Firm* — Carrier Blackman & Associates, P.C.; Joseph P. Carrier; William D. Blackman

(57) ABSTRACT

A windshield of a saddle-riding vehicle is adjustably vertically movable on a windshield support structure, which also suppress windshield rattling. An operating lever is connected to one of two windshield support members. A coupling member extends in a vehicle width direction, and includes end portions connected to left and right fixed rail brackets, which have guide slots formed therein and are pivotally movable about a first rotation axis. The coupling member is also connected to the windshield support members so as to be pivotally movable about a second rotation axis disposed forward of the first rotation axis. The windshield support members and the coupling member constitute parts of a link mechanism. A guide projecting portion is provided on at least one of the windshield support members, and this guide projecting portion is slidably fitted into the guide slot.

20 Claims, 12 Drawing Sheets

POSITIONALLY ADJUSTABLE WINDSHIELD MOUNTING ASSEMBLY FOR A SADDLE-RIDING VEHICLE, AND VEHICLE INCLUDING SAME

CROSS-REFERENCE TO RELATED APPLICATIONS

The present invention claims priority under 35 USC 119 based on Japanese patent application Nos. 2015-038780 and 2015-038781, both filed on 27 Feb. 2015. The entire subject matter of each one of these priority documents, respectively, including specification claims and drawings, is incorporated by reference herein.

BACKGROUND OF THE INVENTION

Technical Field of the Invention

The present invention relates to a saddle-riding vehicle having a windshield that is disposed in front of steering handlebars and is positionally adjustable, and particularly to an improvement in a positionally adjustable windshield mounting assembly for a movable windshield, and also to a vehicle incorporating such mounting assembly.

Background Art

A motorcycle disclosed in Patent Document 1 is known in which a pair of left and right first rails having a first rail groove opening toward a windshield disposed in front of steering handlebars are provided below a left side portion and a right side portion of the windshield, a pair of left and right second rails having a second rail groove opening inward in a vehicle width direction is provided on both of the left side and the right side of the windshield, first supporting member for pivotally supporting the windshield moves along the first rails, and a pair of left and right second supporting members for pivotally supporting both of the left side and the right side of the windshield moves along the second rails, whereby a position of the windshield is capable of being adjusted.

[Patent Document 1]
Japanese Patent Laid-Open No. 2014-28591

In the motorcycle disclosed in the above-described Patent Document 1, a structure for moving the windshield is complex and has a large size.

An improved mechanism for moving the windshield, where such mechanism is simplified and miniaturized, is accordingly desired. However, in achieving the miniaturization, it is also desirable to maintain windshield supporting strength, and also to avoid rattling of the windshield during traveling.

Although the known adjustable windshield mounting systems have some utility for their intended purposes, a need still exists in the art for an improved positionally adjustable windshield mounting assembly, and to a vehicle incorporating such windshield mounting assembly.

SUMMARY OF THE INVENTION

The present invention has been made in view of such a situation, and it is an object of the present invention to provide a positionally adjustable windshield assembly for a saddle-riding vehicle, which can permit adjustable movement of a windshield by a simple and miniaturized structure, and which can suppress rattling of the windshield.

Means for Solving the Problem

In order to achieve the above object, according to a first feature of the present invention, there is provided a positionally adjustable windshield assembly for a saddle-riding vehicle in which a windshield is disposed in front of steering handlebars so as to be movable vertically, the positionally adjustable windshield assembly including: supporting members disposed on both of a left side and a right side of the windshield; an operating lever connected to at least one of a pair of the supporting members so as to be manually operable to vertically move the windshield; a pair of left and right fixed rail brackets each having a guide slot guiding movement of the supporting members; and a coupling member extending in a vehicle width direction, both end portions in a longitudinal direction of the coupling member being connected to the pair of the left and right rail brackets so as to be pivotable about a first rotation axis; at least the supporting members and the coupling member constituting a link mechanism, the coupling member being connected to the supporting members so as to be pivotable about a second rotation axis disposed in front of the first rotation axis, and at least one of the supporting members being provided with a guide projecting portion disposed in a projecting manner above a straight line connecting the first rotation axis and the second rotation axis to each other, the guide projecting portion being slidably fitted into the guide slot.

In addition, according to a second feature of the present invention, in addition to the constitution of the first feature, the guide slot is formed so as to guide the guide projecting portion upward as the coupling member is rotated upward about the first rotation axis according to an operation of the operating lever, the operation being performed in a direction of moving the windshield upward.

According to a third feature of the present invention, in addition to the constitution of the first or second feature, the guide slot is formed in the rail bracket so as to extend in a curved manner, a long hole extending in a direction of intersecting the guide slot is formed in the operating lever, and the guide projecting portion fitted into the guide slot is inserted into the long hole.

According to a fourth feature of the present invention, in addition to one of the constitutions of the first to third features, a center line passing through a center in a width direction of the guide slot and an arc having the second rotation axis as a center of the arc and passing through a center of the guide projecting portion are set so as to intersect each other at an acute angle on an upper front side of the guide slot.

According to a fifth feature of the present invention, in addition to one of the constitutions of the first to fourth features, a windshield biasing spring biasing the windshield upward is provided between at least one of the rail brackets and the coupling member.

According to a sixth feature of the present invention, in addition to one of the constitutions of the first to fifth features, the operating lever is pivotally supported by the rail bracket on a left side of the pair of the left and right rail brackets.

Further, according to a seventh feature of the present invention, in addition to one of the constitutions of the first to sixth features, the operating lever, the supporting members, and the coupling member constitute the link mechanism such that the coupling member is pivotable via the supporting members according to an operation of the operating lever.

Effects of the Invention

According to the first feature of the present invention, the link mechanism including, as constituent elements thereof, at least the supporting members provided on both of the left side and the right side of the windshield and the coupling member whose two end portions in the longitudinal direction are pivotally connected to the fixed rail brackets having the guide slot into which the guide projecting portion provided to the supporting member is slidably fitted is disposed on both of the left side and the right side of the windshield so as to enable vertical movement of the windshield. The vertical movement of the windshield is therefore made possible by a simple and miniaturized structure. Furthermore, the guide projecting portion slides within the guide slot above the straight line connecting the first and second rotation axis to each other. Therefore the windshield can be supported from the rear at two positions vertically separated from each other. Thus, the rattling of the windshield during traveling can be suppressed.

In addition, according to the second feature of the present invention, when the operating lever is operated in the direction of moving the windshield upward, the guide slot guides the guide projecting portion of the supporting member upward. As the windshield is moved upward, a distance between the supporting points of the two upper and lower positions at which the rail bracket supports the windshield from the rear is increased. A structure can therefore be obtained which retains the windshield securely and prevents the rattling of the windshield from occurring easily even in a state of being subject to a traveling wind.

According to the third feature of the present invention, the guide projecting portion fitted into the guide slot that extends in a curved manner and which is formed in the rail bracket is inserted into the long hole which extends in the direction of intersecting the guide slot and which is formed in the operating lever. Thus, the windshield can be moved so as to describe an appropriate locus without the operating lever being enlarged. It is therefore possible to suppress enlargement of the operating lever, and simplify the movable device.

According to the fourth feature of the present invention, the center line passing through the center in the width direction of the guide slot and the arc having the second rotation axis as the center of the arc and passing through the center of the guide projecting portion intersect each other. Out of angles formed by the center line and the arc, the angle on the upper front side of the guide slot is an acute angle. The windshield is accordingly supported in an inclined manner such that the guide projecting portion of the supporting member that is pivotable about the second rotation axis is in sliding contact with the side surface of the guide slot. The rattling of the windshield can therefore be suppressed more effectively.

According to the fifth feature of the present invention, the windshield biasing spring provided between at least one of the rail brackets and the coupling member biases the windshield upward. Thus, only a small operating force is required to move the windshield upward, and the windshield can be moved upward easily with the small operating force.

According to the sixth feature of the present invention, the operating lever is pivotally supported by the rail bracket on the left side. Thus, even when the operating lever is operated in a state in which the steering handlebars are turned to the left side to lock the handlebars during parking, it can be made difficult to interfere with the steering handlebars. The operability of the operating lever can therefore be improved.

Further, according to the seventh feature of the present invention, a guide mechanism arranged on both sides of the windshield so as to guide the movement of the windshield and part of the link mechanism for moving the windshield are formed by the common supporting members. The vertical movement of the windshield is thus made possible by a simple and miniaturized structure. In addition, the simple structure can suppress resistance caused by rattling, and thus facilitate the movement of the windshield.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

A number of selected illustrative embodiments of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Figure 1:
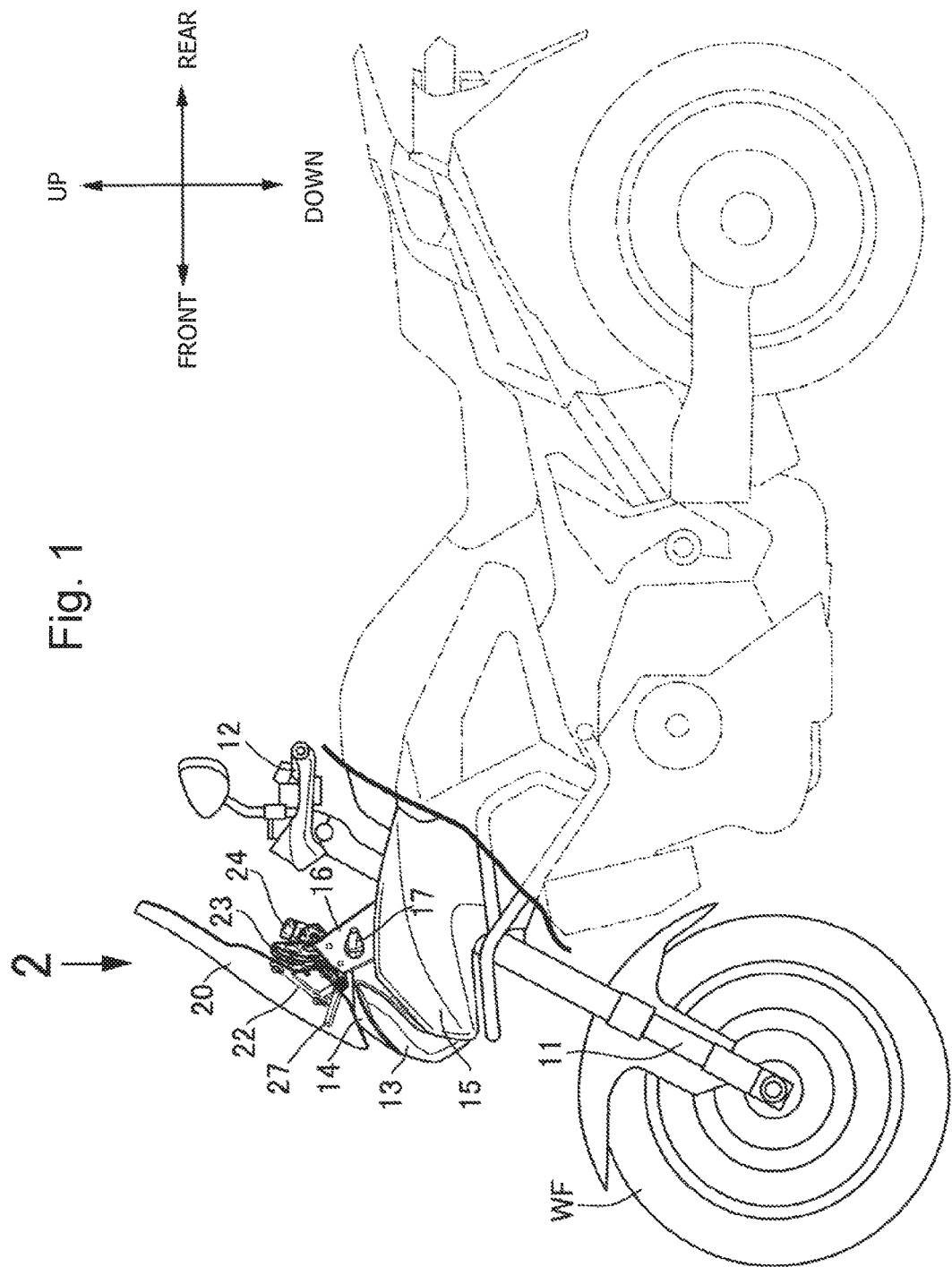
FIG. 1 is a left side view of a motorcycle according to a first embodiment.

First, in FIG. 1, a front fork 11, which pivotally supports a front wheel WF, and steering handlebars 12 connected to the front fork 11 are steerably arranged in a front portion of the motorcycle as a saddle-riding vehicle. A headlight 13 and a headlight cover 14 covering the headlight 13 are arranged in front of the front fork 11 and the steering handlebars 12.

Figure 2:
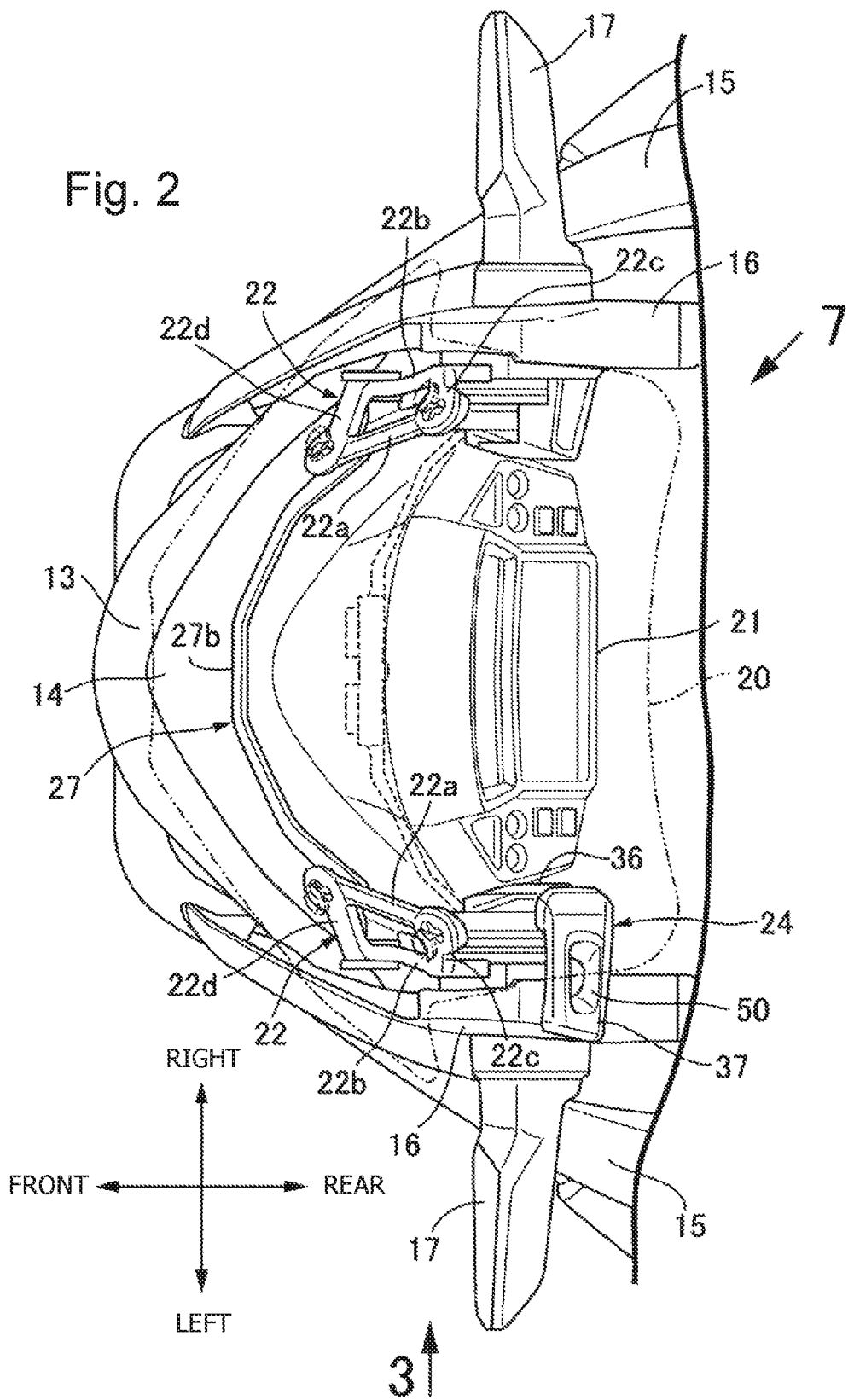
FIG. 2 is a fragmentary plan view of the motorcycle as viewed from the direction of an arrow 2 of FIG. 1.

Referring also to FIG. 2, a pair of left and right side cowls 15, covering part of the front fork 11 and part of the steering handlebars 12 from the left and right sides, respectively, are disposed on the sides of the headlight cover 14. In addition, a pair of left and right cowl support stays 16, fixed to a front portion of a vehicle body frame (not shown) is disposed so as to project upwardly from upper front portions of the left and right side cowls 15. Turn signals 17 are each attached to these cowl support stays 16.

Referring also to FIGS. 3 to 7, both end portions of a coupling frame 18 are fastened to the pair of left and right cowl support stays 16 by respective pairs of first screw members 19. The coupling frame 18 supports the headlight 13.

A positionally adjustable windshield 20 is disposed above the headlight 13 and in front of the steering handlebars 12. Bilaterally symmetrical windshield support members 22, which are mirror images of one another, are respectively fastened to lower portions of the windshield 20 on the left and right sides thereof. An instrument panel, including a meter unit 21 that displays vehicle information, is supported above the coupling frame 18 between the left and right windshield support members 22, in an area between the windshield 20 and the steering handlebars 12. The meter unit 21 is disposed above the coupling frame 18.

The windshield support members 22 are each formed so as to integrally include: a first vertical frame portion 22a that vertically extends such that both of an upper end portion and a lower end portion of the first vertical frame portion 22a are fastened to the windshield 20; a second vertical frame portion 22b that vertically extends on the outside in a vehicle width direction of the first vertical frame portion 22a; an upper horizontal frame portion 22c that couples an upper end portion of the second vertical frame portion 22b to an upper portion of the first vertical frame portion 22a; and a lower horizontal frame portion 22d that couples a lower end portion of the second vertical frame portion 22b to a lower portion of the first vertical frame portion 22a.

Vertical adjustment of the windshield support members 22, on the left and right sides of the windshield 20, is guided by a pair of left and right fixed rail brackets 23 that are also formed bilaterally symmetrically so as to be substantially mirror images of one another.

An operating lever 24, that allows the windshield 20 to be manually operated so as to be vertically adjustable, is connected to at least one of the windshield support members 22, or to the windshield support member 22 on the left side in the illustrated embodiment.

The rail brackets 23 are arranged on the inside of the cowl support stays 16 in the vehicle width direction, and are fastened to the cowl support stays 16 by a first bolt 25 and a second bolt 26 disposed rearwardly and obliquely upwardly of the first bolt 25.

A coupling member (connecting bar) 27 extends between the windshield support members 22, in the vehicle width direction and behind a lower portion of the windshield 20. The coupling member 27 is pivotally connected to lower end portions of the second vertical frame portions 22b of the windshield support members 22 by second screw members 28. The respective end portions of the coupling member 27, in the longitudinal direction, are also pivotally connected to the left and right rail brackets 23, as will be further described herein.

The coupling member 27 is formed so as to integrally include: a pair of left and right supporting arm portions 27a that are disposed inboard of the rail brackets 23 and which extend in a forward-rearward direction; and a bridging portion 27b that extends in the vehicle width direction behind the lower portion of the windshield 20 and which connects the supporting arm portions 27a together. Both end portions of the coupling member 27, that is, rear end portions of the supporting arm portions 27a, are pivotally connected to the rail brackets 23 so as to be pivotally movable about a first rotation axis C1 (see FIG. 4). Front ends of the supporting arm portions 27a of the coupling member 27 are pivotally connected to the windshield support members 22, at the lower ends of the second vertical frame portions 22b, so as to be pivotable about a second rotation axis C2, that is, the axis of the second screw members 28, disposed in front of the first rotation axis C1.

Figure 8:
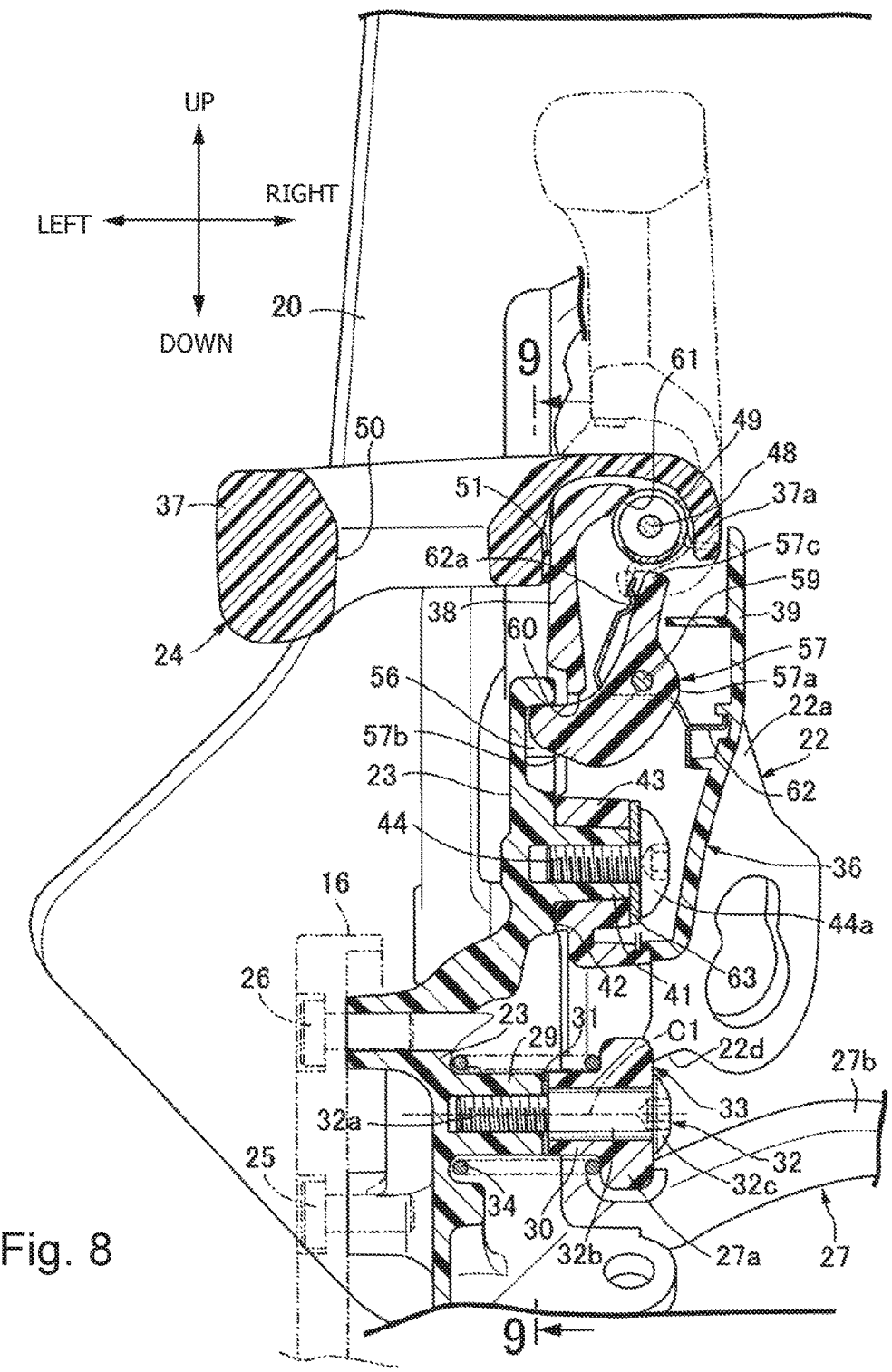
FIG. 8 is a sectional view taken along a line 8-8 of FIG. 4.

Referring also to FIG. 8, each of the rail brackets 23 integrally has a cylindrical first boss portion 29 projected below the second bolt 26, the first boss portion 29 being disposed coaxially with the first rotation axis C1. The rear end of the supporting arm portion 27a of the coupling member 27 integrally has a first supporting tubular portion 30 projected toward the side of the first boss portion 29.

A third screw member 32 inserted into the coupling member 27, the first supporting tubular portion 30, and a first washer 31 with the first washer 31 interposed between the first boss portion 29 and the first supporting tubular portion 30 is screwed into the first boss portion 29 coaxially with the first rotation axis C1. The third screw member 32 is formed so as to integrally include: a screw shaft portion 32a screwed into the first boss portion 29; a bar-shaped large-diameter shaft portion 32b that is formed so as to have a larger diameter than the screw shaft portion 32a and is coaxially continuous with the screw shaft portion 32a such that one end portion of the large-diameter shaft portion 32b abuts against the first washer 31; and an enlarged-diameter head portion 32c coaxially continuous with another end portion of the large-diameter shaft portion 32b so as to abut against an external surface of the end portion of the coupling member 27 on an opposite side from the rail bracket 23. The large-diameter shaft portion 32b of the third screw member 32 pivotally supports the end portion of the coupling member 27.

Figure 9:
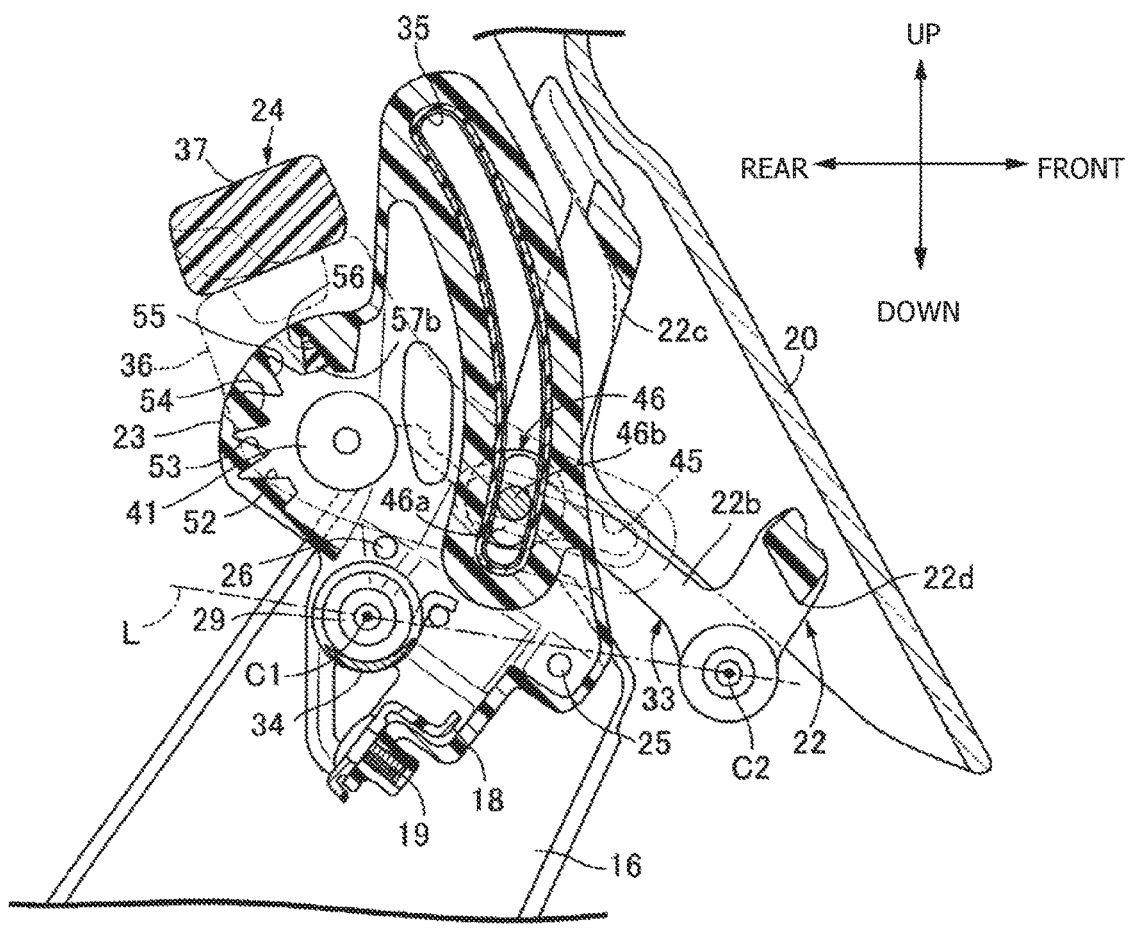
FIG. 9 is a sectional view taken along a line 9-9 of FIG. 8.

Referring also to FIG. 9, a first torsion spring 34 is provided between the rail bracket 23 and the coupling member 27, and is configured to surround the first boss portion 29 and the first supporting tubular portion 30. In addition, a guide slot 35, that guides the windshield support member 22 along the movement path of the windshield 20, is formed in the rail bracket 23 so as to extend in a curved manner.

Figure 10:
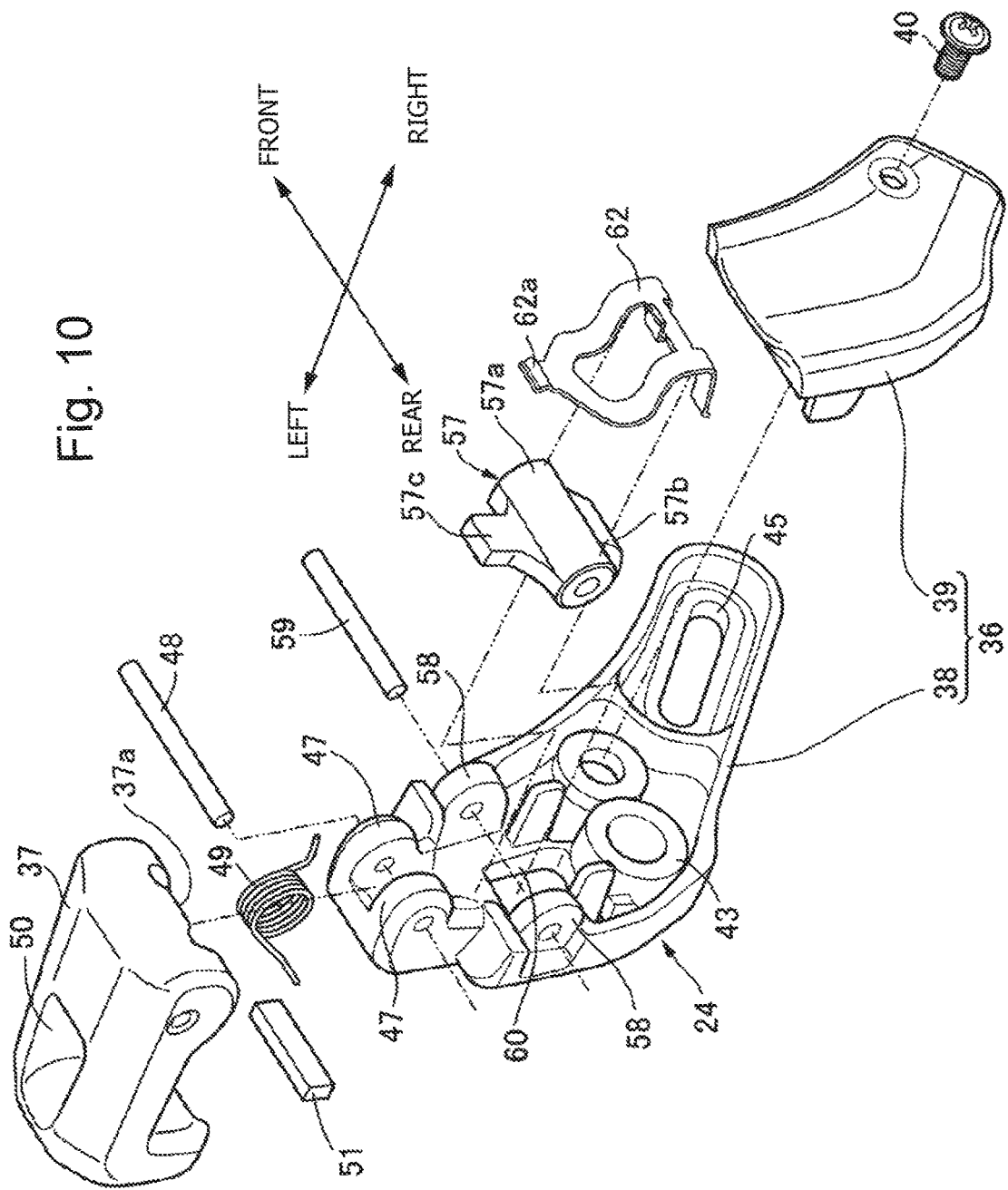
FIG. 10 is an exploded perspective view of an operating lever.

Referring also to FIG. 10, the operating lever 24 includes: a lever main subunit 36 that is pivotally supported by the rail bracket 23 on the left side of the pair of left and right rail brackets 23 and is connected to the windshield support member 22 on the left side; and a grip 37 connected to the lever main subunit 36 and configured to be grippable by a vehicle user. The grip 37 is connected to the lever main subunit 36 so as to be able to be operated between a projecting position of projecting from the lever main subunit 36 (position indicated by solid lines in FIG. 11) and a housed position of being folded to the side of the lever main subunit 36 (position indicated by solid lines in FIGS. 2 to 9).

The lever main subunit 36 includes: a lever main body 38 pivotally supported by the rail bracket 23 on the left side; and a cover member 39 fastened to the lever main body 38 by a fourth screw member 40 so as to cover part of the lever main body 38 from the inside in the vehicle width direction.

Above the second bolt 26, the rail bracket 23 on the left side integrally has a projected cylindrical second boss portion 41, and has an annular receiving surface 42 formed so as to surround a base end portion of the second boss portion 41. A cylindrical second supporting tubular portion 43 into which to fit the second boss portion 41 is formed integrally with the lever main body 38 such that one end portion of the second supporting tubular portion 43 is in sliding contact with the receiving surface 42. A fourth screw member 44 having an enlarged-diameter head portion 44a is screwed into the second boss portion 41 with a second washer 63 interposed between the enlarged-diameter head portion 44a and another end portion of the second supporting tubular portion 43. That is, the lever main body 38, that is, the lever main subunit 36 is supported by the rail bracket 23 on the left side so as to be pivotable about the axis of the second boss portion 41.

The coupling member 27, which is pivotally connected to the rail bracket 23 so as to be pivotable about the first rotation axis C1, is also connected to the windshield support member 22 so as to be pivotable about the second rotation axis C2 disposed in front of the first rotation axis C1. Thus, at least the coupling member 27 and the windshield support members 22 cooperate to define a link mechanism 33. In the present embodiment, the operating lever 24, the coupling member 27, and the windshield support members 22 all cooperate to define the link mechanism 33. This link mechanism 33 allows the coupling member 27 to be selectively pivotally moved via the windshield support members 22, according to an operation of the operating lever 24.

A long hole 45, linearly extending in a direction of intersecting the curved guide slot 35 of the rail bracket 23, is also formed in the lever main body 38. A guide projecting portion 46 disposed above a straight line L (FIGS. 4, 6) connecting the first and second rotation axis C1 and C2 to each other is projected from the upper end portion of the second vertical frame portion 22b in the windshield support member 22 on the left side. This guide projecting portion 46 is slidably fitted into the guide slot 35, and is also inserted into the long hole 45.

As seen best in FIG. 9, the guide projecting portion 46 in the depicted embodiment is formed so as to include: a slide part 46a that is formed so as to extend along the longitudinal direction of the guide slot 35 and which slides within the guide slot 35; and a pin part 46b that slides within the long hole 45. The guide projecting portion 46 in the present embodiment is fastened to the windshield support member 22.

Optionally, if desired, the guide projecting portion 46 may be formed with a different structure so as to include: a slide part (not shown) that is formed so as to extend along the longitudinal direction of the long hole 45 and which slides within the long hole 45; and a pin part (not shown) that slides within the guide slot 35.

The guide slot 35 is formed so as to guide the guide projecting portion 46 upward as the coupling member 27 is rotated upward about the first rotation axis C1 according to an operation of the operating lever 24, which operation is performed in a direction of moving the windshield 20 upward. The guide slot 35 in the present embodiment is formed so as to extend vertically while curved so as to extend frontward as it moves upwardly.

Figure 4:
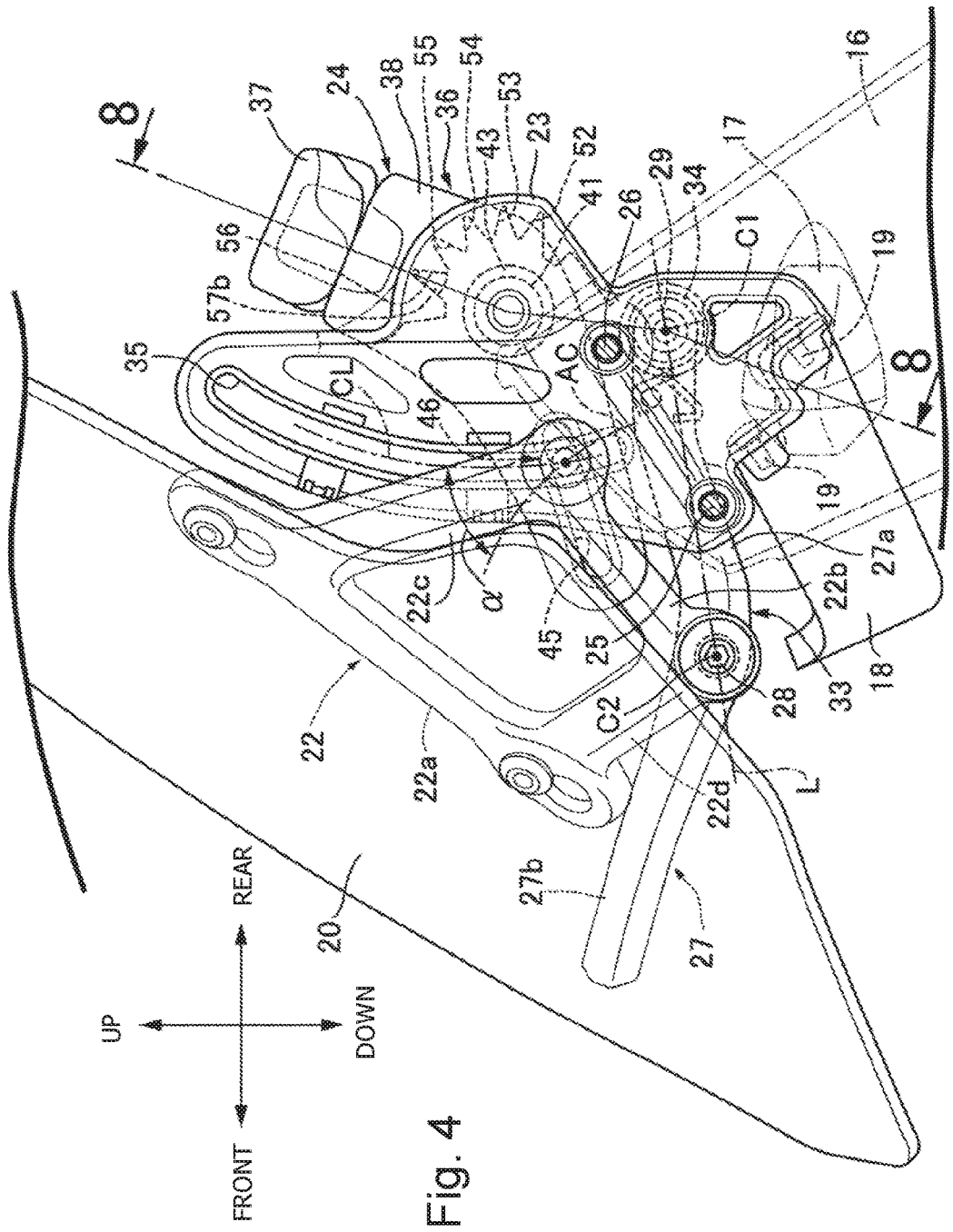
FIG. 4 is a fragmentary enlarged view of FIG. 3.
Figure 6:
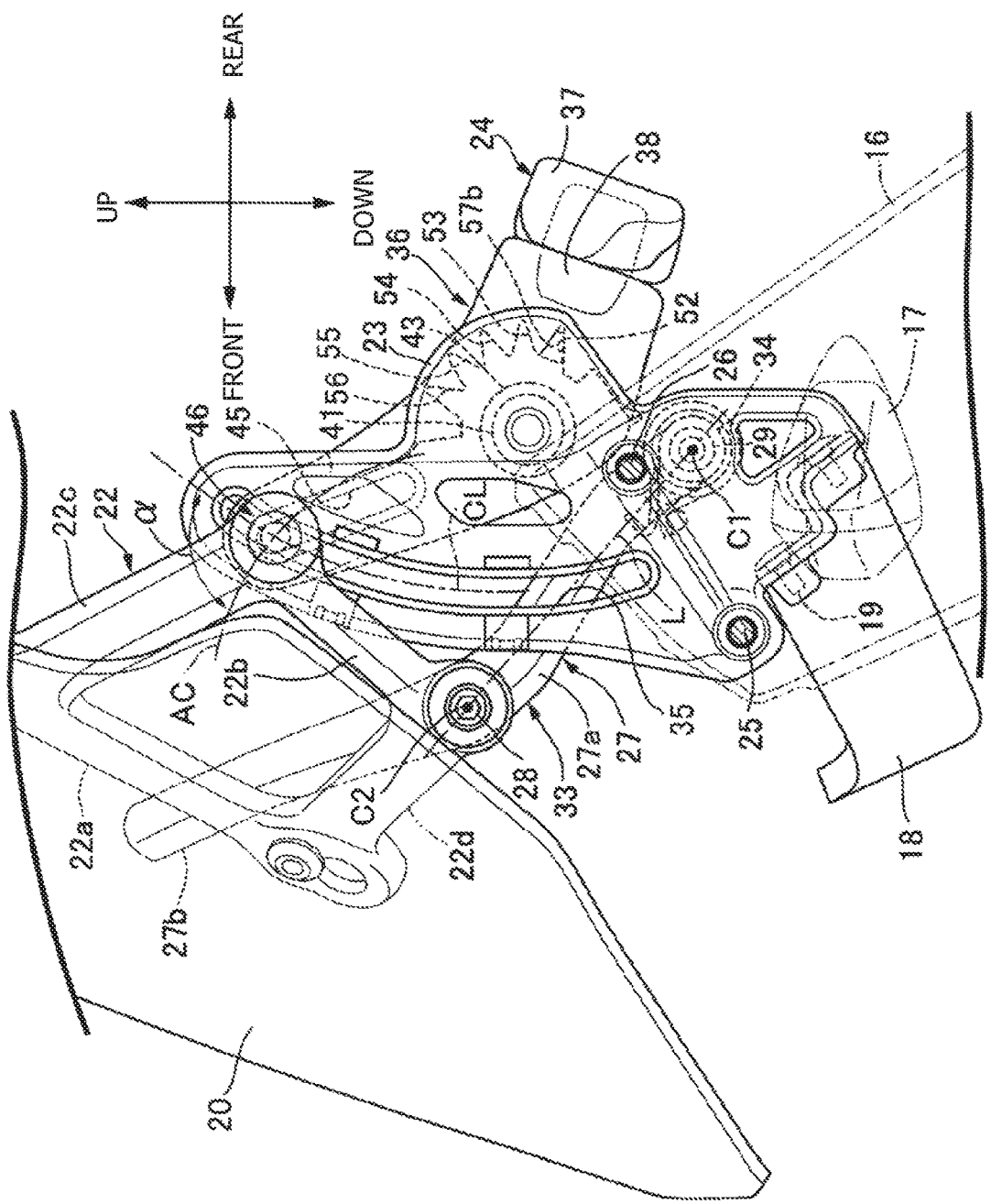
FIG. 6 is a fragmentary enlarged view of FIG. 5.
Figure 7:
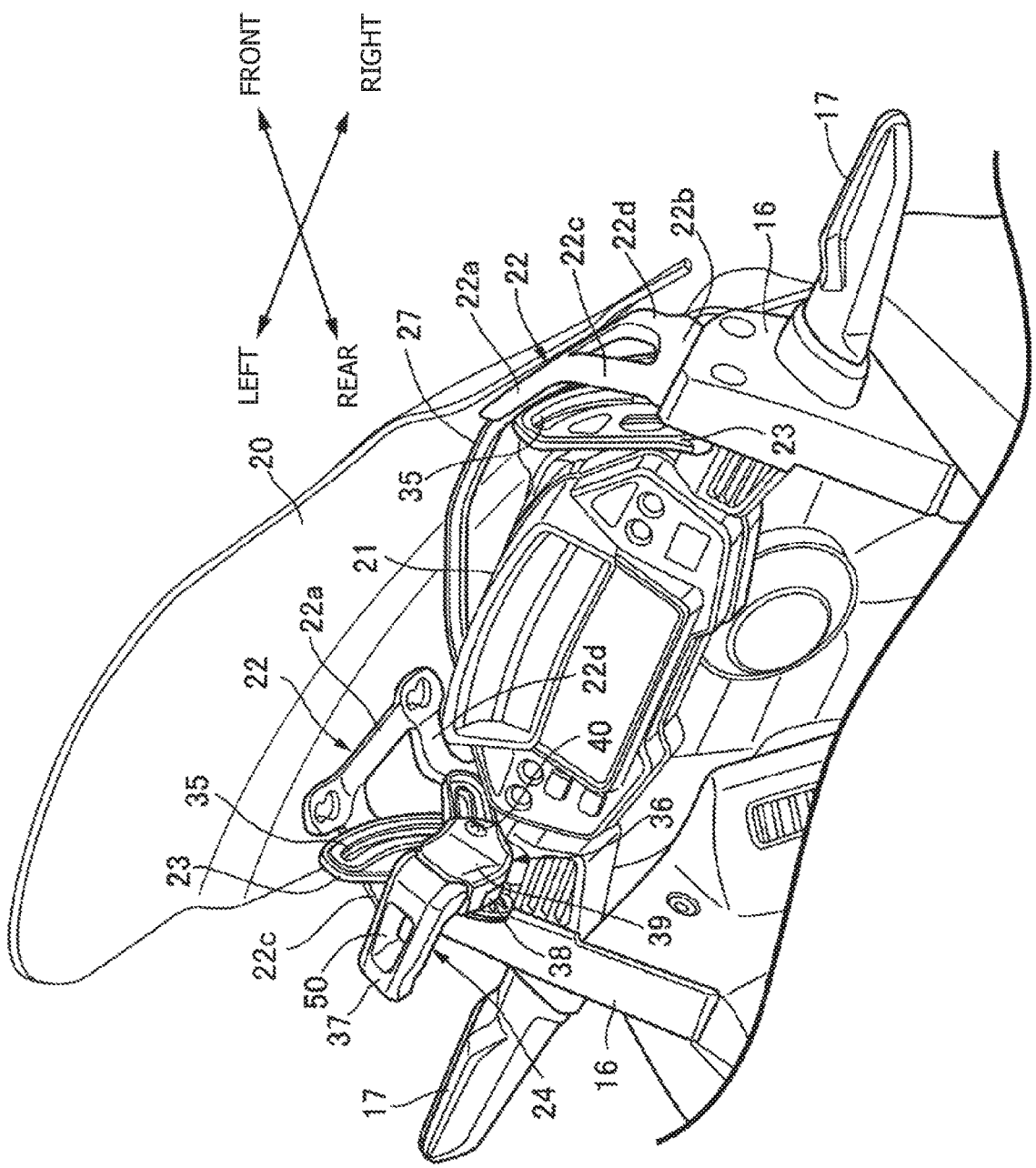
FIG. 7 is a perspective view as viewed from the direction of an arrow 7 of FIG. 2.

Furthermore, as clearly shown in FIG. 4 and FIG. 6, relative positions of the second rotation axis C2, the guide projecting portion 46, and the guide slot 35 are set such that a center line CL passing through the center in the width direction of the guide slot 35 and an arc AC having the second rotation axis C2 as a center of the arc AC and passing through the center of the guide projecting portion 46 intersect each other at an acute angle α on the upper front side of the guide slot 35.

One end portion of the grip 37 is pivotally connected via a first supporting pin 48 to a pair of grip supporting portions 47 formed on an end portion of the lever main body 38 on an opposite side from the second bolt 26 with respect to the second boss portion 41 such that the grip 37 in the housed position is folded outward in the vehicle width direction from the lever main subunit 36. A second torsion spring 49 surrounding the first supporting pin 48 is provided between the lever main body 38 and the grip 37 so as to exert a spring force biasing the grip 37 to the housed position.

Furthermore, a lightening hole 50 is formed in the grip 37, and relative positions of the rail bracket 23 on the left side and the operating lever 24 are set such that the grip 37 in the housed position is disposed behind the rail bracket 23 on the left side. In addition, an elastic member 51, that elastically abuts against the lever main body 38 while the grip 37 is in the housed position, is stuck to the grip 37.

Above the second boss portion 41, the rail bracket 23 on the left side is provided with a plurality of locking recessed portions individually corresponding to a plurality of vertical positions of the windshield 20, or five locking recessed portions 52, 53, 54, 55, and 56 in the present embodiment, the locking recessed portions being arranged at equal intervals in the circumferential direction of the second boss portion 41. A lock member 57, that operates so as to selectively engage with the plurality of locking recessed portions 52 to 56 as the grip 37 is folded to the housed position, is housed within the lever main subunit 36.

Between the second boss portion 41 and the grip supporting portions 47, a pair of lock member supporting portions 58 is formed integrally with the lever main body 38. The lock member 57 is pivotally supported by the lock member supporting portions 58 via a second supporting pin 59.

The lock member 57 is formed so as to integrally include: a tubular lock member main portion 57a coaxial with the second supporting pin 59; an engaging pawl portion 57b that projects from the lock member main portion 57a so as to project to the side of the rail bracket 23 on the left side; and a pressure receiving arm portion 57c that projects from the lock member main portion 57a so as to abut against a pressing arm portion 37a integrally provided to the grip 37.

An end portion of the engaging pawl portion 57b can be projected from a first opening portion 60 formed in the lever main body 38 to the side of the rail bracket 23 on the left side to selectively engage with the locking recessed portions 52 to 56.

In this case, at least one of a surface of the end portion of the engaging pawl portion 57b in the lock member 57 which surface faces the side of the locking recessed portions 52 to 56 and surfaces of parts corresponding to intervals between the locking recessed portions 52 to 56 of the rail bracket 23 which surfaces face the side of the engaging pawl portion 57b may be formed so as to be a curved surface bulging outward so as to facilitate the selective engagement of the engaging pawl portion 57b with the locking recessed portions 52 to 56.

In addition, the pressing arm portion 37a of the grip 37 has an end portion that is thrust into the lever main subunit 36 from a second opening portion 61 formed between the lever main body 38 and the cover member 39 in the vicinity of the grip supporting portions 47. The end portion of the pressing arm portion 37a abuts against the pressure receiving arm portion 57c.

The cover member 39 is fitted with a plate spring 62 having an elastic arm portion 62a that abuts against the pressure receiving arm portion 57c from an opposite side from the pressing arm portion 37a and which exerts an elastic force biasing the lock member 57 so as to project the engaging pawl portion 57b from the first opening portion 60 to the side of the rail bracket 23 on the left side.

Figure 3:
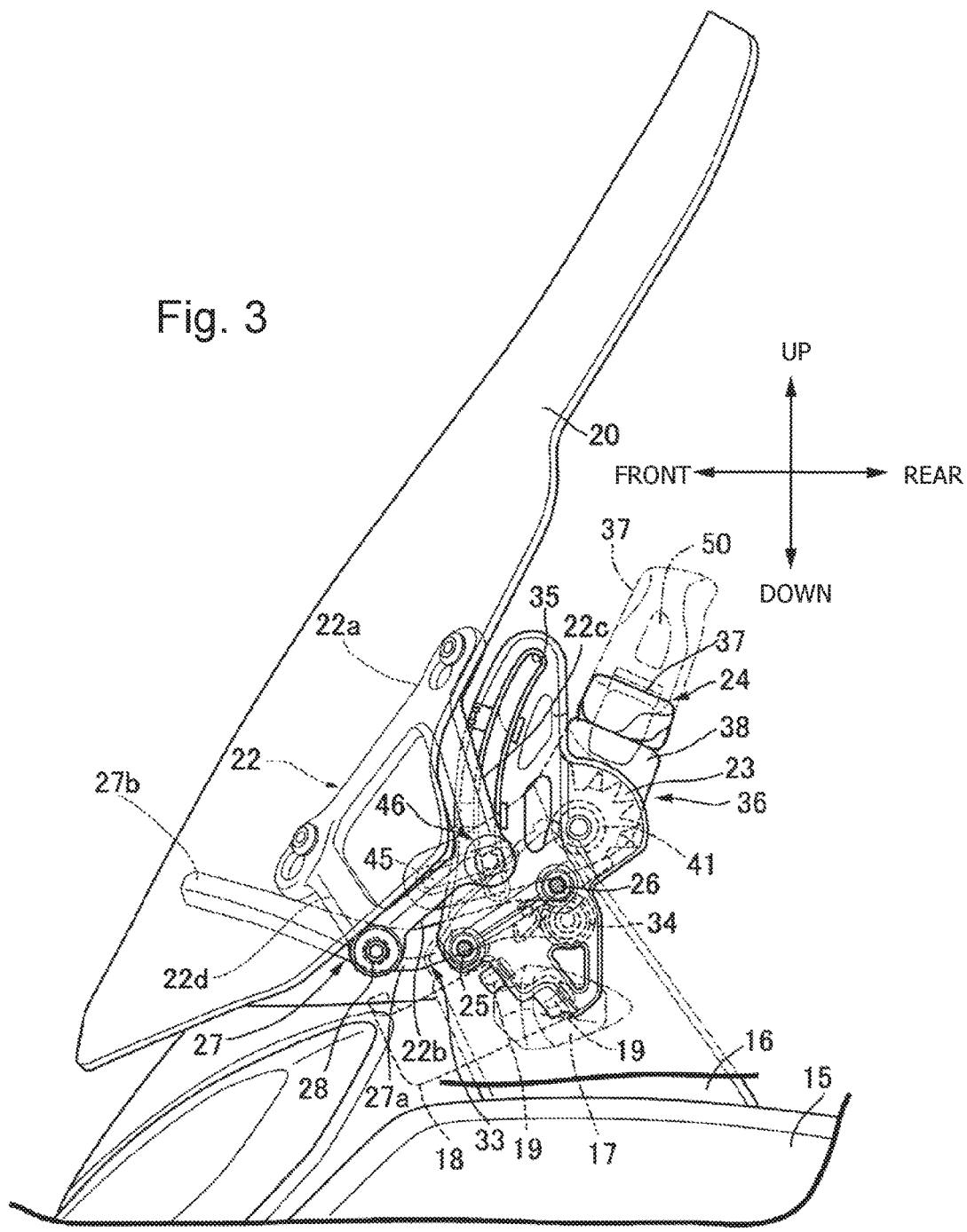
FIG. 3 is a left side view as viewed from the direction of an arrow 3 of FIG. 2, the left side view showing a state in which a windshield is lowered.
Figure 5:
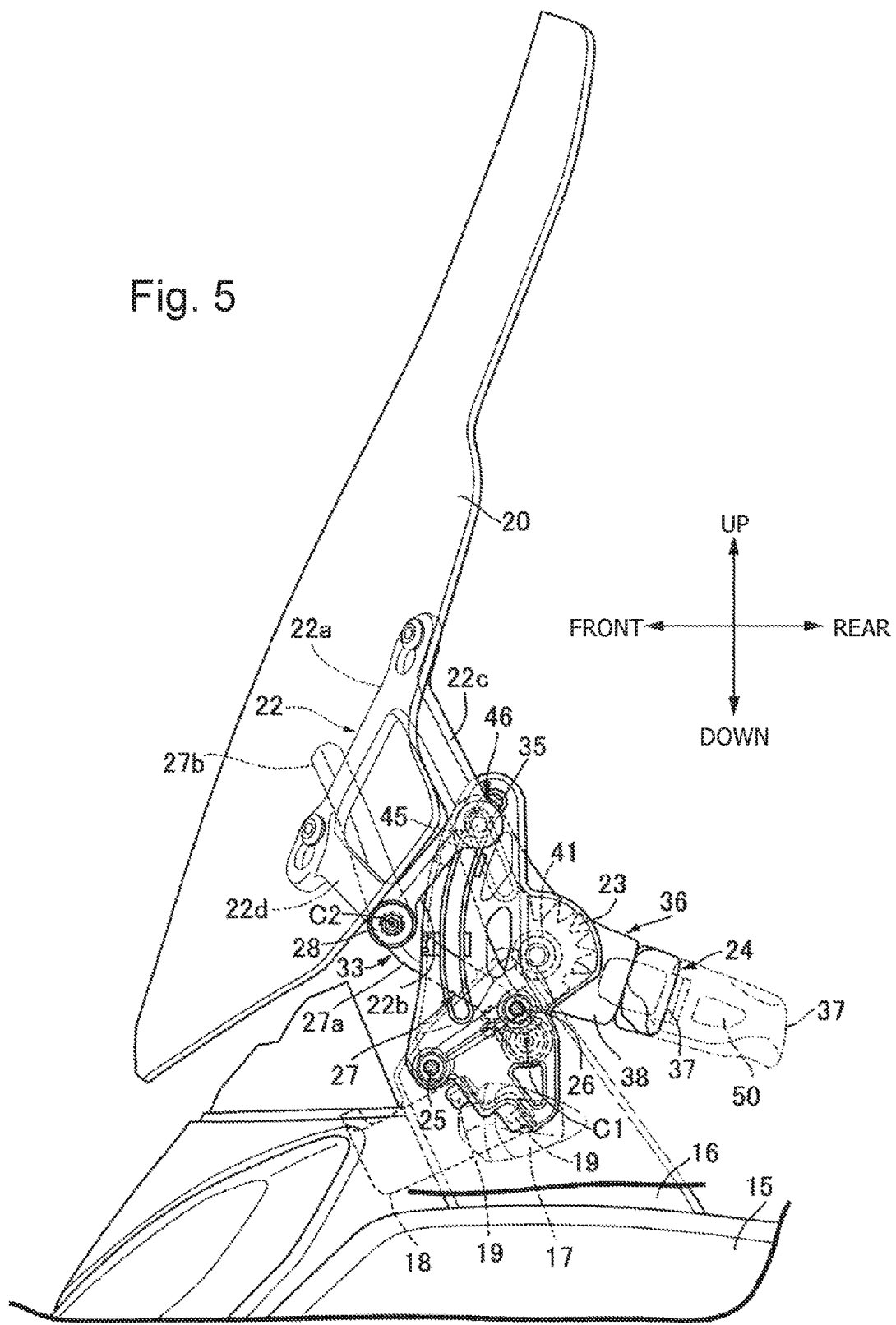
FIG. 5 is a left side view showing a state in which the windshield is raised, the left side view corresponding to FIG. 3.
Figure 11:
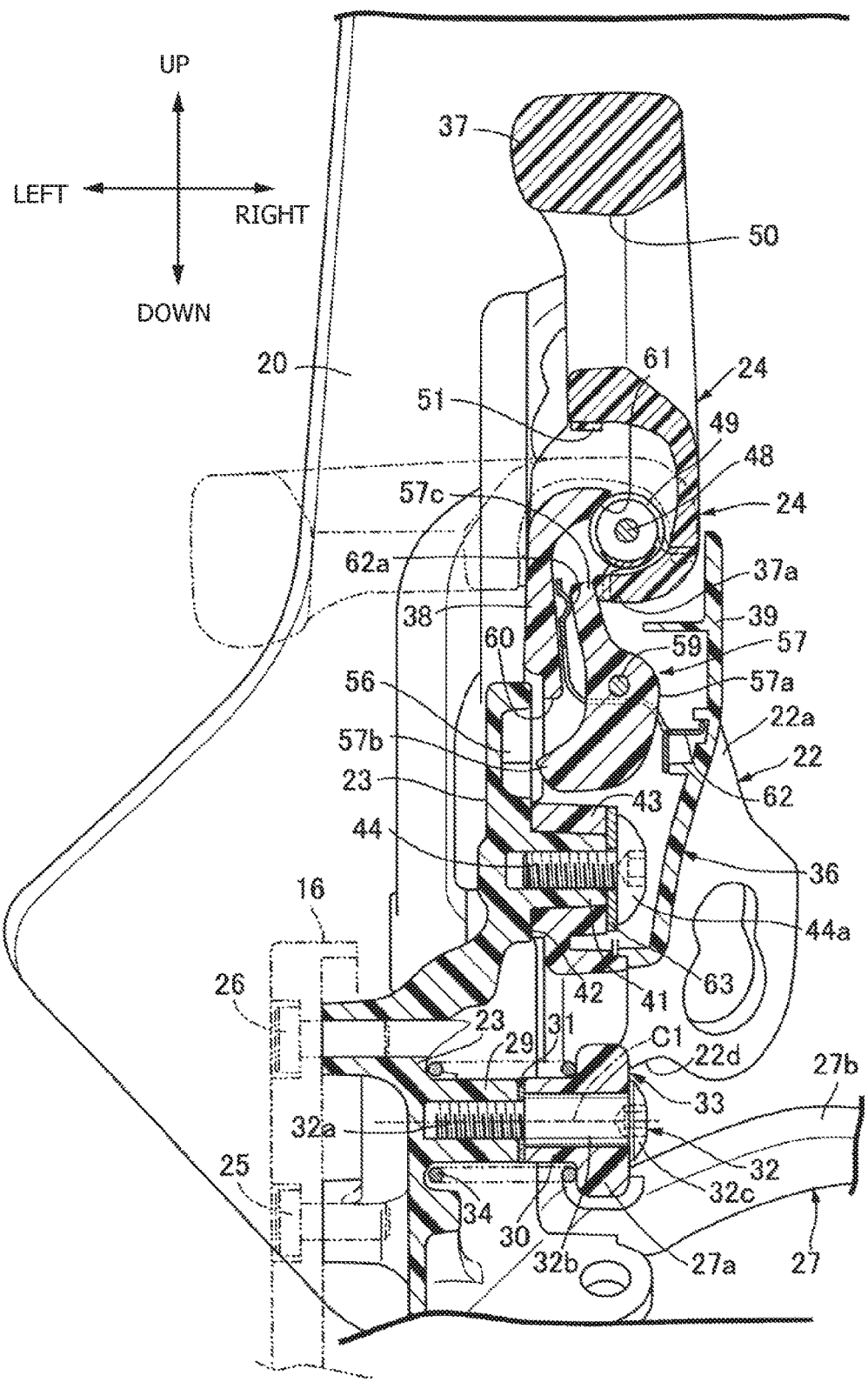
FIG. 11 is a sectional view showing a state in which a grip is set in a projecting position, the sectional view corresponding to FIG. 8.

As shown in FIG. 11, when the grip 37 is set in the projecting position, the pressing arm portion 37a presses the pressure receiving arm portion 57c of the lock member 57. The lock member 57 is thereby rotated against the spring force of the plate spring 62 to a position in which the lock member 57 is released from the selective engagement of the engaging pawl portion 57b with the locking recessed portions 52 to 56. A rotating operation of the operating lever 24 in this state can vertically move the windshield 20 in a set range. The guide projecting portion 46 of the windshield support member 22 on the left side moves within the guide slot 35 and the long hole 45. Then, as shown in FIG. 3, FIG. 4, and FIG. 8, when the windshield 20 is moved to a lowermost position and the grip 37 is folded to the housed position, the engaging pawl portion 57b engages with the uppermost locking recessed portion 56 to maintain the lowermost position of the windshield 20. As shown in FIG. 5 and FIG. 6, when the windshield 20 is moved to an uppermost position and the grip 37 is folded to the housed position, the engaging pawl portion 57b engages with the lowermost locking recessed portion 52 to maintain the uppermost position of the windshield 20.

Next describing the action of the first embodiment, the vertical movement of the windshield support members 22 provided to both of the left side and the right side of the windshield 20 is guided by the fixed rail brackets 23. The operating lever 24 connected to at least one of the pair of windshield support members 22 so as to be manually operable to vertically move the windshield 20 includes: the lever main subunit 36 pivotally supported by at least one of the pair of rail brackets 23 and connected to at least one windshield support member 22; and the grip 37 connected to the lever main subunit 36 so as to be able to be gripped by a vehicle user.

The grip 37 is connected to the lever main subunit 36 so as to be able to be operated between the projecting position of projecting from the lever main subunit 36 and the housed position of being folded to the side of the lever main subunit 36. Thus, the long operating lever 24 in the state in which the grip 37 is in the projecting position is operated to vertically move the windshield 20. A force for operating the operating lever 24 can therefore be reduced to improve operability. In addition, after an operation is performed so as to move the windshield 20, the grip 37 is folded to the housed position on the side of the lever main subunit 36. Therefore, a movable device including the operating lever 24 can be made compact, and in this folded state, the visibility of the windshield 20 can be improved.

In addition, the operating lever 24 is pivotally supported by the rail bracket 23 on the left side of the pair of left and right rail brackets 23. Thus, even when the operating lever 24 is operated in a state in which the steering handlebars 12 are turned to the left side to lock the handlebars during parking, it can be made difficult to interfere with the steering handlebars 12. The operability of the operating lever 24 can therefore be improved.

In addition, the meter unit 21 that displays vehicle information is disposed between the pair of left and right windshield support members 22, and the grip 37 is connected to the lever main subunit 36 such that the grip 37 in the housed position is folded outward in the vehicle width direction from the lever main subunit 36. Thus, disposing the grip 37 in the housed position in a position not overlapping the meter unit 21 can eliminate a fear of accidentally operating buttons arranged on the meter unit 21 when operating the grip 37 to the side of the projecting position. Hence, the operability of the operating lever 24 can be enhanced, and the visibility of the meter unit 21 is improved.

In addition, at least the windshield support members 22 and the coupling member 27 constitute the link mechanism 33 that allows the coupling member 27 to be rotated via the windshield support members 22. In the present embodiment, the operating lever 24, the windshield support members 22, and the coupling member 27 constitute the link mechanism 33 that allows the coupling member 27 to be rotated via the windshield support members 22 according to an operation of the operating lever 24. Therefore, a guide mechanism arranged on both sides of the windshield 20 so as to guide the movement of the operating lever 24 and the windshield 20 and part of the link mechanism 33 for moving the windshield 20 are formed by the common windshield support members 22. The vertical movement of the windshield 20 is thus made possible by the simple and miniaturized structure. Moreover, the simple structure can suppress resistance caused by rattling, and thus facilitate the movement of the windshield 20.

Furthermore, the coupling member 27 that extends in the vehicle width direction and whose two end portions in the longitudinal direction are connected to the pair of left and right rail brackets 23 so as to be pivotable about the first rotation axis C1 is connected to the windshield support members 22 so as to be pivotable about the second rotation axis C2 disposed in front of the first rotation axis C1 such that at least the windshield support members 22 and the coupling member 27 constitute the link mechanism 33. The guide projecting portion 46 provided in a projecting manner on the windshield support member 22 above the straight line L connecting the first rotation axis C1 and the second rotation axis C2 to each other is slidably fitted in the guide slot 35. Thus, the windshield 20 can be supported from the rear at two positions that are vertically separated from each other. The rattling of the windshield 20 during traveling can therefore be suppressed.

In addition, the guide slot 35 is formed so as to guide the guide projecting portion 46 upward as the coupling member 27 is rotated upward about the first rotation axis C1 according to an operation of the operating lever 24 which operation is performed in a direction of moving the windshield 20 upward. Thus, a distance between the supporting points of the two upper and lower positions at which the rail bracket 23 supports the windshield 20 from the rear is increased as the windshield 20 is moved upward. A structure can therefore be obtained which retains the windshield 20 securely and prevents the rattling of the windshield 20 from occurring easily even in a state of being subject to a traveling wind.

In addition, the relative positions of the second rotation axis C2, the guide projecting portion 46, and the guide slot 35 are set such that the center line CL passing through the center in the width direction of the guide slot 35 and the arc AC having the second rotation axis C2 as the center of the arc AC and passing through the center of the guide projecting portion 46 intersect each other at the acute angle α on the upper front side of the guide slot 35. The windshield 20 is therefore supported in an inclined manner such that the guide projecting portion 46 of the windshield support member 22 pivotable about the second rotation axis C2 is in sliding contact with the side surface of the guide slot 35. Thus, the rattling of the windshield 20 can be suppressed more effectively.

In addition, the first torsion spring 34 that biases the windshield 20 upward is provided between the rail bracket 23 and the coupling member 27. Thus, only a small operating force is required to move the windshield 20 upward, and the windshield 20 can be moved upward easily with the small operating force.

Furthermore, the pair of left and right windshield support members 22 is connected to each other by the coupling member 27. This not only improves the operability of the windshield 20 by enabling smooth movement of the windshield 20 while the vertical positions of the left and right windshield support members 22 at a time of a vertical movement of the windshield 20 are made identical with each other, but also enhances the stiffness of the windshield support members 22, thus making it possible to firmly support the windshield 20. In addition, the curved guide slot 35 formed in the rail bracket 23 can reduce the weight of the rail bracket 23, and thus contribute to a reduction in weight of the vehicle body.

In addition, the guide slot 35 in the rail bracket 23 is formed so as to extend in a curved manner. The long hole 45 extending in a direction of intersecting the guide slot 35 is formed in the lever main subunit 36. The guide projecting portion 46 provided in a projecting manner on the windshield support member 22 is inserted into the guide slot 35 and the long hole 45. Thus, the windshield 20 can be moved such that the windshield 20 describes an appropriate locus without the operating lever 24 being enlarged. It is therefore possible to suppress enlargement of the operating lever 24, and simplify the movable device.

In addition, the lightening hole 50 is formed in the grip 37. A vehicle user can thus hold the grip 37 easily, and thereby move the windshield 20 with a small force. Besides, it is possible to achieve a reduction in cost by reducing an amount of resin forming the grip 37, and contribute to a reduction in weight of the motorcycle by reducing the weight of the operating lever 24. Furthermore, it is possible to contribute to an improvement in riding comfort of the motorcycle by reducing the rolling in of a traveling wind occurring around the windshield 20.

In addition, the relative positions of the rail bracket 23 on the left side and the operating lever 24 are set such that the grip 37 in the housed position is disposed behind the rail bracket 23 on the left side. The movable device including the operating lever 24 can therefore be made compact and simplified.

Further, the plurality of locking recessed portions 52 to 56 individually corresponding to the plurality of vertical positions of the windshield 20 are provided to one rail bracket 23, and the lock member 57 that operates so as to selectively engage with the plurality of locking recessed portions 52 to 56 as the grip 37 is folded to the housed position is housed within the lever main subunit 36. Thus, the compact constitution with the small number of parts can retain the windshield 20 at arbitrary vertical positions. Furthermore, because no ratchet mechanism is provided, the windshield 20 does not need to be moved to a predetermined position, and the windshield 20 can be moved freely. The movable device can therefore provide good usability. Because the windshield 20 becomes movable only when the grip 37 is in the projecting position, the windshield 20 can be moved with a small force.

A second embodiment of the present invention will be described with reference to FIG. 12 and FIG. 13. The parts corresponding to those of the first embodiment will be identified by the same reference symbols and only shown in the figures, and detailed description thereof will be omitted.

A lever main body 38 of a lever main subunit 36 in an operating lever 24 has a long hole 65 formed so as to extend in a direction of intersecting a curved guide slot 35 formed in a rail bracket 23. A pin-shaped guide projecting portion 66 having a circular cross section is provided in a projecting manner on a windshield support member 22 (see the first embodiment). The guide projecting portion 66 is slidably fitted into the guide slot 35, and is inserted into the long hole 65.

Figure 12:
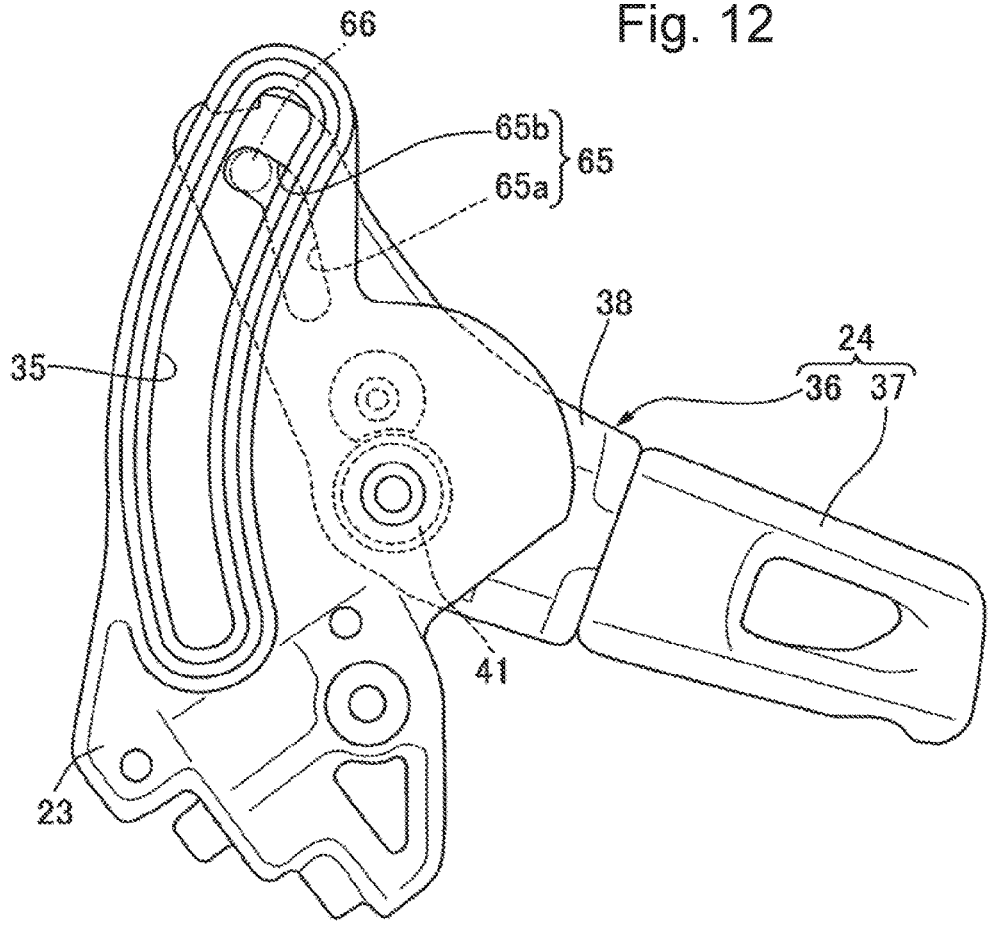
FIG. 12 is a side view of an operating lever and a rail bracket according to a second embodiment.
Figure 13:
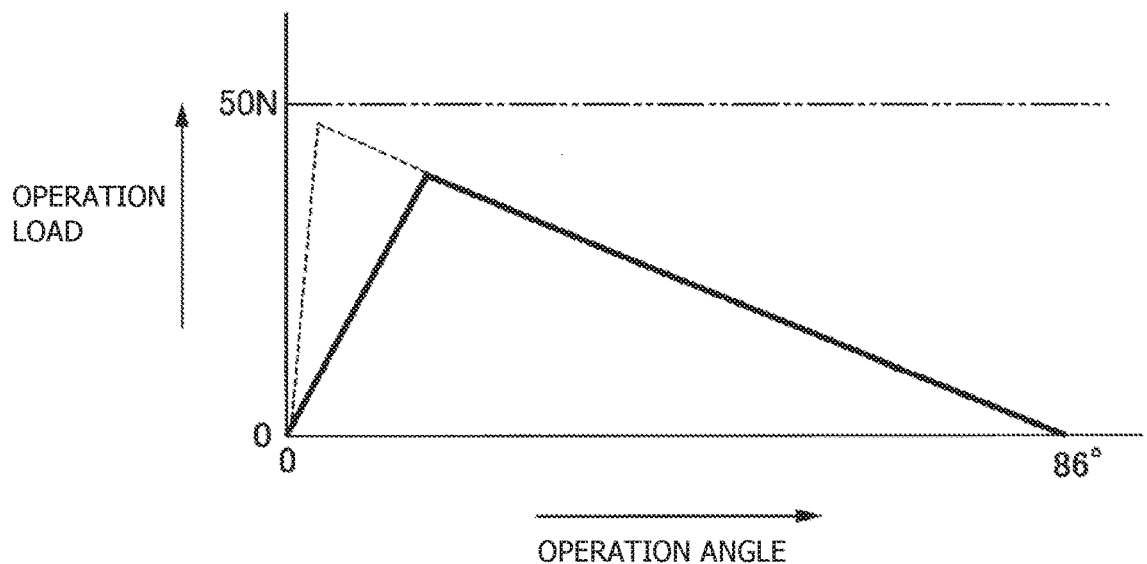
FIG. 13 is a diagram showing changes in operation load with respect to the operation angle of the operating lever.

In contrast to the long hole 45 in the first embodiment, the long hole 45 being formed so as to extend linearly, the long hole 65 formed in the lever main body 38 is formed so as to include: a lower long hole portion 65a that extends in an upward-downward direction in a state of FIG. 12 in which a windshield 20 (see the first embodiment) is lifted to an uppermost position by rotating the operating lever 24 downward; and an upper long hole portion 65b that bends from an upper end of the lower long hole portion 65a and extends in a direction substantially orthogonal to the guide slot 35.

When the windshield 20 is lowered downward by performing an operation of rotating the operating lever 24 having such a long hole 65 upward, a force from the lever main body 38 acts on the guide projecting portion 66 in a direction along the guide slot 35 at the beginning of the operation. Thus, as indicated by a solid line in FIG. 13, an initial load rises gently, so that an operation feeling is improved. On the other hand, when the long hole 45 extends linearly as shown in the first embodiment, a force from the lever main body 38 acts on the guide projecting portion 66 in a direction of pressing against the side surface of the guide slot 35 at the beginning of the operation. Thus, as indicated by a chain line in FIG. 13, an initial load rises sharply, which may invite a degradation in the operation feeling.

Embodiments of the present invention have been described above. However, the present invention is not limited to the foregoing embodiments, but various design changes can be made without departing from the present invention as described in the claims.

For example, the operating lever 24 may be disposed on the right side in the vehicle width direction. In addition, the grip 37 may be folded inward in the vehicle width direction.

In addition, the operating lever 24 may be provided on both of the left side and the right side in the vehicle width direction. In this case, the windshield 20 is moved in a state of being supported on both of the left side and the right side, and thus the windshield 20 moves equally with respect to the left and right rail brackets 23 as compared with a case where the windshield 20 is moved from one side. The rattling of the windshield 20 with respect to the rail brackets 23 can therefore be suppressed.

In addition, in the foregoing embodiments, the operating lever 24 is made pivotable in a state in which the grip 37 is in the projecting position, and when the grip 37 is folded into the housed position, the vertical positions of the operating lever 24 and the windshield 20 are maintained by the selective engagement of the lock member 57 with the plurality of locking recessed portions 52 to 56 provided to the rail bracket 23. Conversely, the rotation of the operating lever 24 may be disabled in the state in which the grip 37 is in the projecting position, and the rotation of the operating lever 24 may be allowed when the grip 37 is folded into the housed position.

Further, the present invention is widely applicable not only to motorcycles but also to saddle-riding vehicles including motorized tricycles.

DESCRIPTION OF REFERENCE SYMBOLS

12 . . . Steering handlebars
20 . . . Screen

22 . . . Supporting member
23 . . . Rail bracket
24 . . . Operating lever
27 . . . Coupling member
33 . . . Link mechanism
34 . . . Screen biasing spring
35 . . . Guide slot
45 and 65 . . . Long hole
46 and 66 . . . Guide projecting portion
AC . . . Arc
C1 . . . First rotation axis
C2 . . . Second rotation axis
CL . . . Center line
α . . . Acute angle
L . . . Straight line Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A positionally adjustable windshield mounting assembly configured for use on a saddle-riding vehicle in which a windshield is supported so as to be movable vertically, said windshield mounting assembly comprising:
   a pair of supporting members, with a respective one of said supporting members disposed on each of a left side and a right side of the windshield;
   an operating lever operatively attached to at least one of the supporting members and manually operable to selectively permit vertical movement of the windshield;
   a pair of left and right rail brackets each having a guide slot formed therein for guiding movement of the supporting members; and
   a coupling member extending in a vehicle width direction and having opposed end portions operatively attached to the left and right rail brackets in a manner permitting pivotal movement of the coupling member about a first rotation axis, the coupling member also being operatively attached to the supporting members in a manner permitting pivotal movement about a second rotation axis disposed in front of the first rotation axis,
   wherein at least one of the supporting members is provided with a guide projecting portion disposed above a straight line interconnecting the first rotation axis and the second rotation axis, the guide projecting portion being slidably fitted into the guide slot.

2. The positionally adjustable windshield mounting assembly on the saddle-riding vehicle according to claim 1, wherein the guide slot is formed so as to guide the guide projecting portion upward as the coupling member is rotated upward about the first rotation axis according to an operation of the operating lever, the operation being performed in a direction of moving the windshield upward.

3. The positionally adjustable windshield mounting assembly on the saddle-riding vehicle according to claim 1, wherein the guide slot of the rail bracket extends in a curved manner, a long hole is formed in the operating lever, and the guide projecting portion includes a part which is inserted into the long hole.

4. The positionally adjustable windshield mounting assembly on the saddle-riding vehicle according to claim 2, wherein the guide slot of the rail bracket extends in a curved manner, a long hole is formed in the operating lever, and the guide projecting portion includes a part which is inserted into the long hole.

5. The positionally adjustable windshield mounting assembly on the saddle-riding vehicle according to claim 1, wherein a center line passing through a center in a width direction of the guide slot and an arc having the second rotation axis as a center of the arc and passing through a center of the guide projecting portion are set so as to intersect each other at an acute angle on an upper front side of the guide slot.

6. The positionally adjustable windshield mounting assembly on the saddle-riding vehicle according to claim 1, wherein a windshield-biasing spring, for biasing the windshield upwardly, is provided between at least one of the rail brackets and the coupling member.

7. The positionally adjustable windshield mounting assembly on the saddle-riding vehicle according to claim 1, wherein the operating lever is rotatably supported on a left side of one of the rail brackets.

8. The positionally adjustable windshield mounting assembly on the saddle-riding vehicle according to claim 1, wherein the operating lever, the supporting members, and the coupling member cooperate to define a link mechanism, which is configured such that the coupling member is pivotally movable, via the supporting members, according to an operation of the operating lever.

9. In a saddle-riding vehicle having a windshield at a front end thereof, a windshield mounting assembly configured to permit vertical adjustment of the windshield, said windshield mounting assembly comprising:
   a pair of supporting members, with a respective one of said supporting members disposed on each of a left side and a right side of the windshield;
   an operating lever operatively attached to at least one of the supporting members so as to be manually operable to selectively permit vertical movement of the windshield;
   a pair of left and right rail brackets each having a guide slot formed therein for guiding movement of the supporting members; and
   a coupling member extending in a vehicle width direction and having opposed end portions operatively attached to the left and right rail brackets in a manner permitting pivotal movement of the coupling member about a first rotation axis, the coupling member also being operatively attached to the supporting members in a manner permitting pivotal movement about a second rotation axis disposed in front of the first rotation axis,
   at least one of the supporting members provided with a guide projecting portion which is slidably fitted into the guide slot.

10. The positionally adjustable windshield mounting assembly in the saddle-riding vehicle according to claim 9, wherein the guide slot is formed so as to guide the guide projecting portion upward as the coupling member is rotated upward about the first rotation axis according to an operation of the operating lever, the operation being performed in a direction of moving the windshield upward.

11. The positionally adjustable windshield mounting assembly in the saddle-riding vehicle according to claim 9, wherein the guide slot of the rail bracket extends in a curved manner, a long hole is formed in the operating lever, and the guide projecting portion includes a part which is inserted into the long hole.

12. A saddle-riding vehicle comprising a vehicle body having a windshield at a front end thereof, and a windshield mounting assembly operatively attached to the vehicle body and configured to permit vertical adjustment of the windshield, said windshield mounting assembly comprising:
- a pair of supporting members, with a respective one of said supporting members disposed on each of a left side and a right side of the windshield;
- an operating lever operatively attached to at least one of the supporting members so as to be manually operable to selectively permit vertical movement of the windshield;
- a pair of left and right rail brackets each having a guide slot formed therein for guiding movement of the supporting members; and
- a coupling member extending in a vehicle width direction and having opposed end portions operatively attached to the left and right rail brackets in a manner permitting pivotal movement of the coupling member about a first rotation axis, the coupling member also being operatively attached to the supporting members in a manner permitting pivotal movement about a second rotation axis disposed in front of the first rotation axis,
- at least one of the supporting members provided with a guide projecting portion which is slidably fitted into the guide slot.

13. The saddle-riding vehicle according to claim 12, wherein the guide slot of the rail bracket extends in a curved manner, a long hole is formed in the operating lever, and the guide projecting portion includes a part which is inserted into the long hole.

14. The saddle-riding vehicle according to claim 13, wherein the guide slot of the rail bracket extends in a curved manner, a long hole is formed in the operating lever, and the guide projecting portion includes a part which is inserted into the long hole.

15. The saddle-riding vehicle according to claim 12, wherein a center line passing through a center in a width direction of the guide slot and an arc having the second rotation axis as a center of the arc and passing through a center of the guide projecting portion are set so as to intersect each other at an acute angle on an upper front side of the guide slot.

16. The saddle-riding vehicle according to claim 12, wherein a windshield-biasing spring, for biasing the windshield upwardly, is provided between at least one of the rail brackets and the coupling member.

17. The saddle-riding vehicle according to claim 12, wherein the operating lever is rotatably supported on a left side of one of the rail brackets.

18. The saddle-riding vehicle according to claim 12, wherein the operating lever, the supporting members, and the coupling member cooperate to define a link mechanism, which is configured such that the coupling member is pivotally movable, via the supporting members, according to an operation of the operating lever.

19. The saddle-riding vehicle according to claim 12, further comprising a pair of spaced apart left and right cowl support stays, fixed to a front portion of the vehicle body and extending upwardly thereon.

20. The saddle-riding vehicle according to claim 19, further comprising a connecting frame portion attached to and extending between the cowl support stays, wherein the rail brackets are attached to opposite end portions of the connecting frame portion.

* * * * *